United States Patent
Shaikli

(10) Patent No.: US 8,255,599 B2
(45) Date of Patent: Aug. 28, 2012

(54) PACKETS TRANSFER DEVICE HAVING DATA ABSORBING BUFFERS WITH ELASTIC BUFFER CAPACITIES

(75) Inventor: Nadim Shaikli, San Diego, CA (US)

(73) Assignee: Integrated Device Technology inc., San Jose, CA (US)

(*) Notice: Subject to any disclaimer, the term of this patent is extended or adjusted under 35 U.S.C. 154(b) by 706 days.

(21) Appl. No.: 11/390,754

(22) Filed: Mar. 28, 2006

(65) Prior Publication Data

US 2007/0260782 A1    Nov. 8, 2007

(51) Int. Cl.
*G06F 3/00* (2006.01)
*G06F 13/36* (2006.01)

(52) U.S. Cl. .......................... 710/52; 710/310

(58) Field of Classification Search .................. 710/52
See application file for complete search history.

(56) References Cited

U.S. PATENT DOCUMENTS

| | | | |
|---|---|---|---|
| 5,790,522 A | 8/1998 | Fichou et al. | |
| 5,842,224 A | 11/1998 | Fenner | |
| 5,987,008 A | 11/1999 | Simpson et al. | |
| 6,499,079 B1* | 12/2002 | Gulick | 710/305 |
| 6,519,225 B1 | 2/2003 | Angle et al. | |
| 6,570,877 B1 | 5/2003 | Kloth et al. | |
| 6,654,381 B2 | 11/2003 | Dally et al. | |
| 6,661,788 B2 | 12/2003 | Angle et al. | |
| 6,738,371 B1* | 5/2004 | Ayres | 370/352 |
| 6,850,490 B1* | 2/2005 | Woo et al. | 370/230 |
| 6,888,831 B1 | 5/2005 | Hospodor et al. | |
| 6,898,182 B1* | 5/2005 | Cloonan | 370/232 |
| 6,954,424 B2 | 10/2005 | Barrack et al. | |
| 7,257,655 B1* | 8/2007 | Burney et al. | 710/105 |
| 7,426,185 B1 | 9/2008 | Musacchio et al. | |
| 7,480,246 B2 | 1/2009 | Agarwal et al. | |
| 7,522,624 B2 | 4/2009 | Barri et al. | |
| 2002/0146037 A1 | 10/2002 | Sugaya et al. | |
| 2003/0196025 A1 | 10/2003 | Dahlen et al. | |
| 2004/0066673 A1* | 4/2004 | Perego et al. | 365/200 |
| 2005/0027906 A1* | 2/2005 | Peterson et al. | 710/52 |
| 2005/0034049 A1 | 2/2005 | Nemawarkar et al. | |
| 2006/0017497 A1 | 1/2006 | Mo et al. | |
| 2006/0018170 A1 | 1/2006 | Au et al. | |
| 2006/0018176 A1 | 1/2006 | Au et al. | |
| 2006/0018177 A1 | 1/2006 | Au et al. | |
| 2006/0020741 A1 | 1/2006 | Au et al. | |
| 2006/0020742 A1 | 1/2006 | Au et al. | |
| 2006/0020743 A1 | 1/2006 | Au et al. | |
| 2006/0020761 A1 | 1/2006 | Au et al. | |
| 2006/0109789 A1* | 5/2006 | Skerritt | 370/238 |
| 2007/0112995 A1* | 5/2007 | Manula et al. | 710/310 |
| 2008/0109570 A1 | 5/2008 | Leonard et al. | |
| 2008/0126571 A1 | 5/2008 | Leonard et al. | |

* cited by examiner

Primary Examiner — Henry W. H. Tsai
Assistant Examiner — Titus Wong
(74) Attorney, Agent, or Firm — Tracy Parris

(57) ABSTRACT

In PCI-Express and alike communications systems, data bandwidth per channel can vary as a result of negotiated port bifurcation during network bring-up. Disclosed are systems and methods for adjusting FIFO depths in response to negotiated bandwidth per channel so that data absorbing FIFO's of respective channels are not arbitrarily too deep or too shallow relative to the data bandwidths of the channels the FIFO's serve.

14 Claims, 4 Drawing Sheets

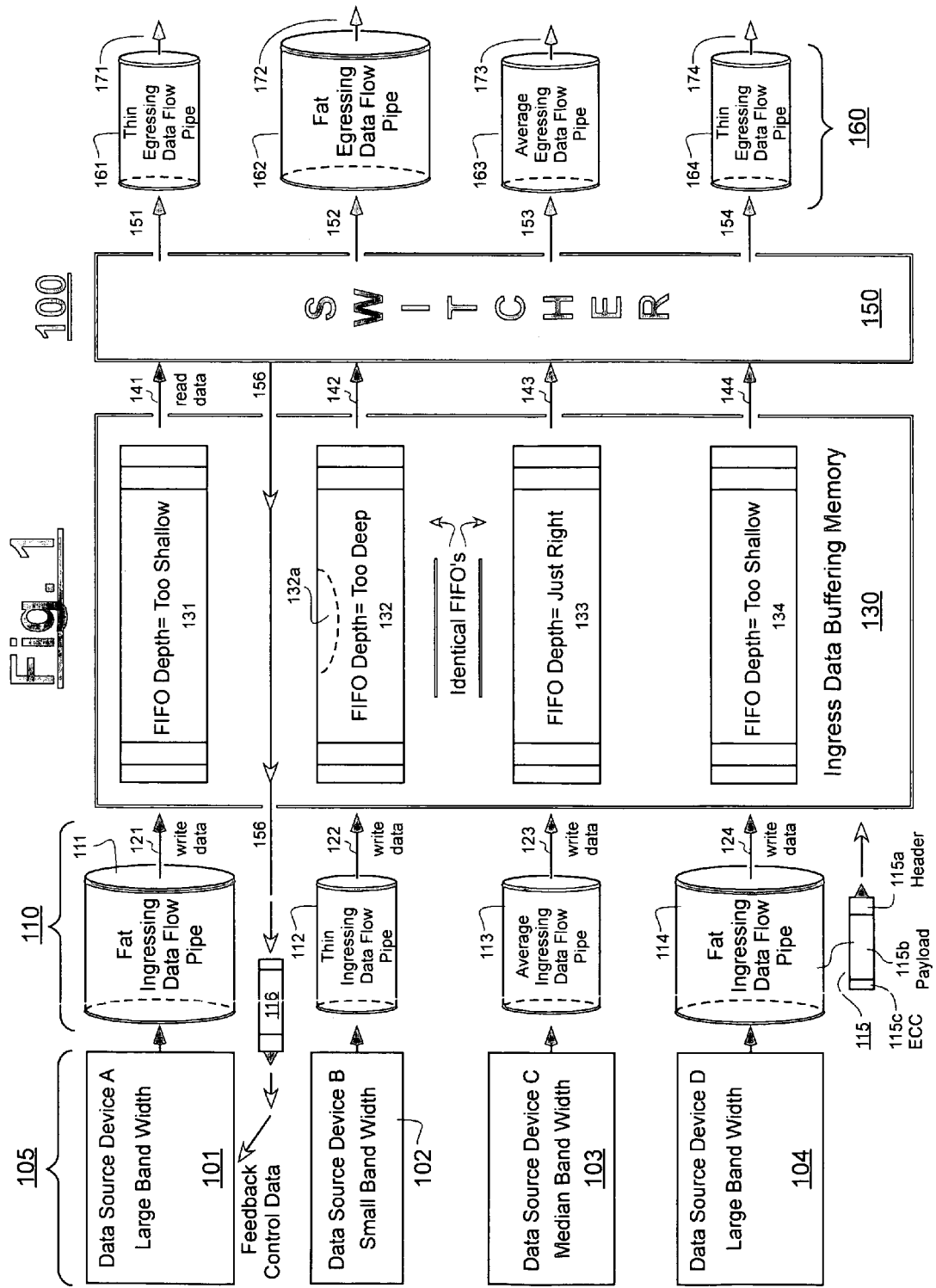

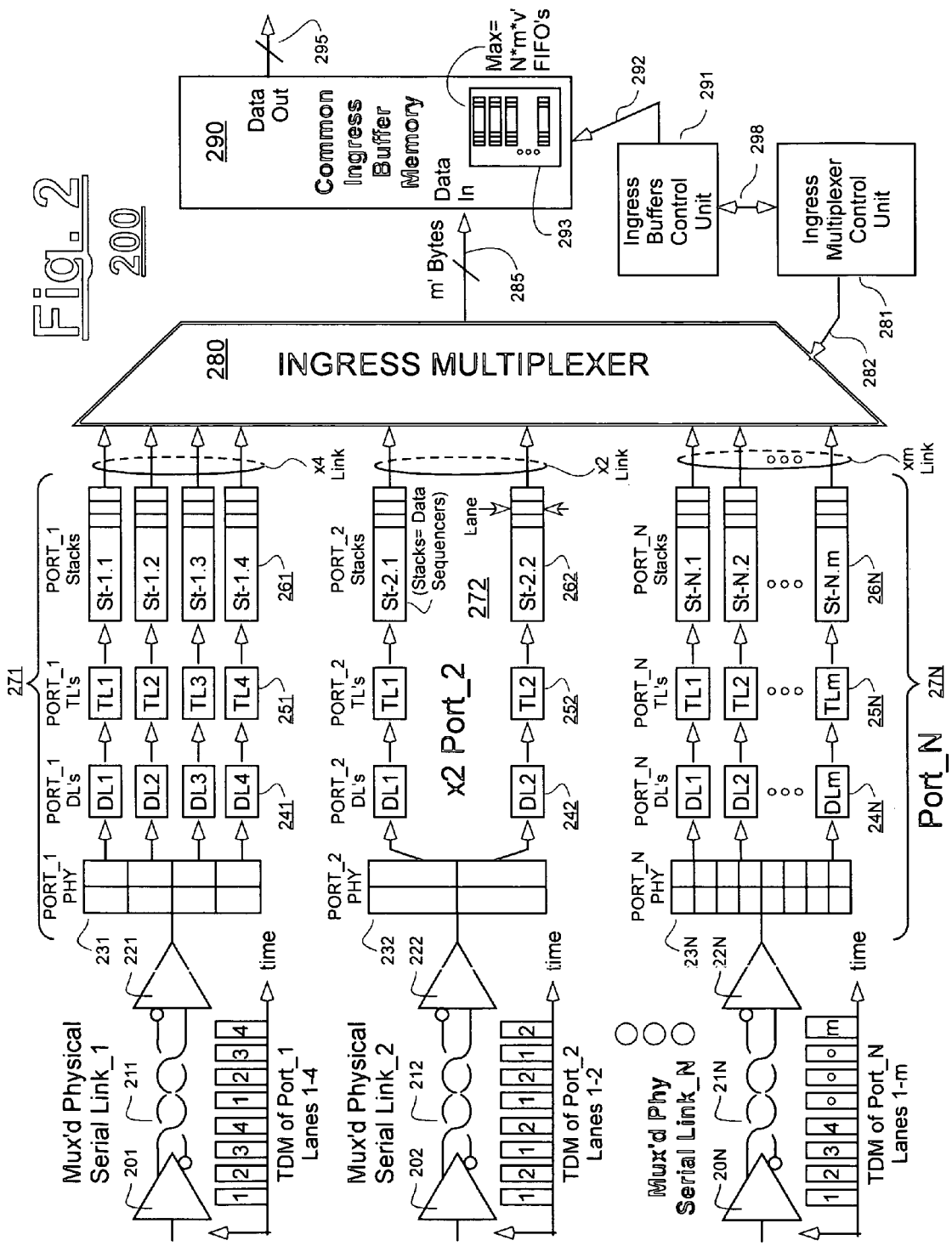

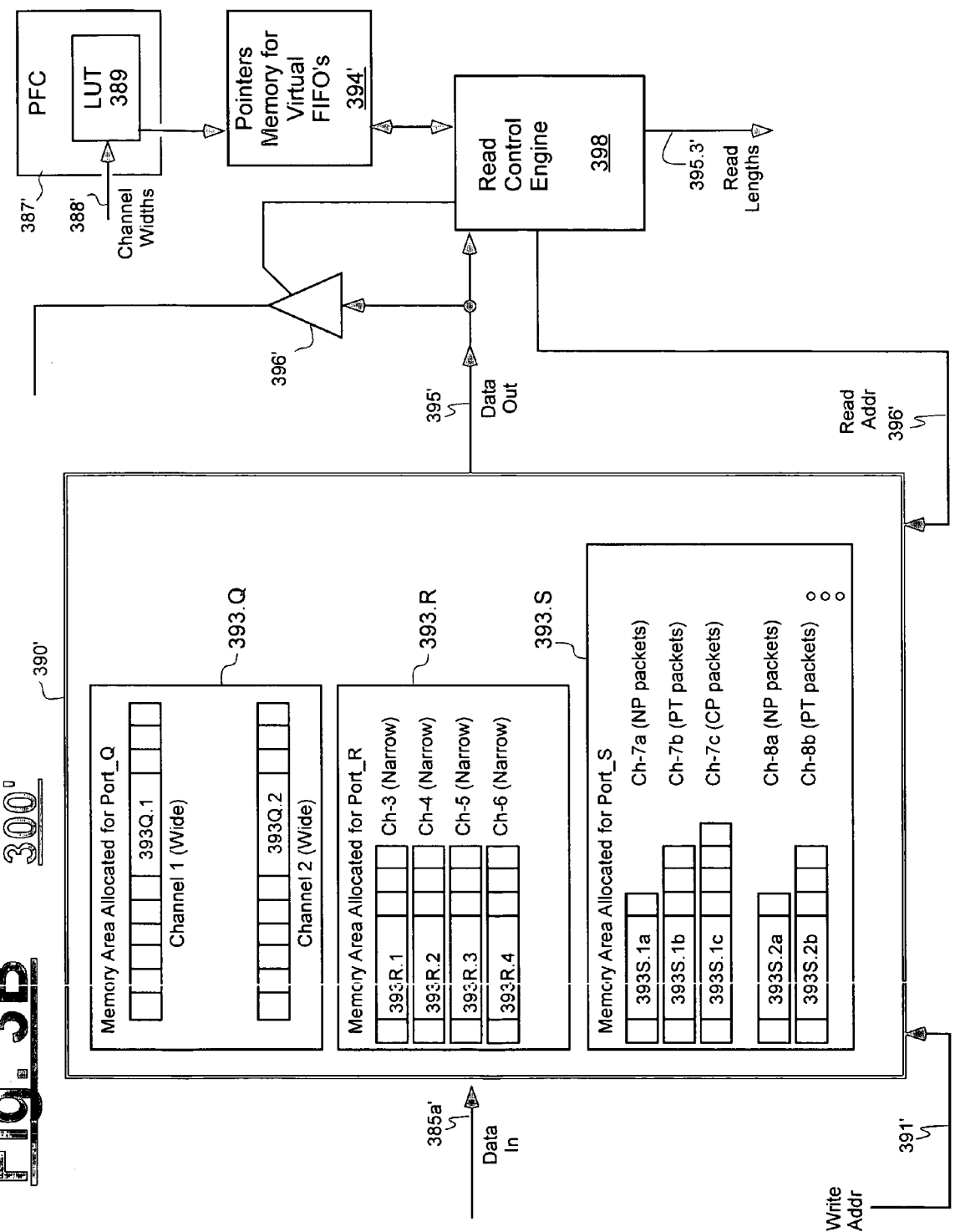

US 8,255,599 B2

PACKETS TRANSFER DEVICE HAVING DATA ABSORBING BUFFERS WITH ELASTIC BUFFER CAPACITIES

FIELD OF DISCLOSURE

The present disclosure of invention relates generally to telecommunication systems that transmit information in serialized or semi-serialized format (e.g., packet format). The disclosure relates more specifically to systems that can employ ingress and egress flow rates of dynamically adjustable values for different communication channels.

DESCRIPTION OF RELATED ART

The use of digitally-encoded packets in telecommunication systems is well known. Typically each packet is layered like an onion to have header-type outer shell sections, a payload core section and one or more error correction sections that cover various parts of the core or outer shells. When packet signals are transmitted over a physical link means (e.g., a twisted wire connection) from a source device to a receiving device, the packet signals that arrive at the receiving device typically progress through a physical interface layer (PHY), and then through one or both of a data link layer (DL) and a transaction layer (TL). The physical interface layer (PHY) may include means for serializing and deserializing data (SERDES). The data link layer (DL) may include means for managing error checking and error correction (e.g., ECC). The transaction layer (TL) may include means for parsing (peeling the onion skin layers on different parts of each kind of packet. Packet signals leaving a source device typically progress in the reverse order, namely, first through a transaction layer (TL), then through a data link layer (DL) and finally through the sender's physical interface layer (PHY) for output onto a physical transmission media (e.g., a high frequency cable(s), twisted wire pair(s) or printed circuit strip(s)).

Packet data that is ingressing into a receiving device typically gets routed to a parallel set of data-absorbing and smoothing buffers (e.g., First-In, First-Out buffers, or FIFO's for short) before being further processed by data-processing means that performs better when receiving a continuous or smooth stream of packet or other sequential data. The data-absorbing buffers (e.g., front end FIFO's) act somewhat like shock absorbers in that each absorbs and smoothes out the often-bursty nature of ingress data on each of respective data channels. A conventional paradigm configures all the ingress receiving FIFO's of a communications device to be of the same depth and width. In other words, all the ingress FIFO's have a same data length per stored word (number of bits per word) and a same number of storage locations between ends (a same depth for each of the plural FIFO's).

Recently, a number of communication protocols are gaining favor wherein dynamically variable data rates are supported for plural channels. Included among these emerging protocols are the PCI-Express™ protocol and the Hyper-Transport™ protocol. These relatively new, industry standardized protocols allow different logical channels to each have a different, programmably-established channel configuration. For example, one logically-configured communication channel may be programmably aggregated to contain many, relatively slow sub-channels while another logically-configured channel may be established to have one or just a few, such slow or basic sub-channels. The data bandwidth of the channel containing a greater aggregation of basic sub-channels will generally be larger then the data bandwidth of the channel having just one or few sub-channels aggregated together. A trade off is made between number of sub-channel resources consumed per communication channel and the bandwidth of each such channel. In the realm of PCI-Express™, these variable bandwidth channels are referred to as logical "links" and the lowest common speed, sub-channels are each referred to as a "lane".

When a PCI-Express™ network is adaptively configured during network bring-up, the software determines how many lanes (subchannels) to assign each PCI-Express™ "port" or PCIe logical "link" (the terms PCIe port and PCIe link are sometimes used interchangeably). A first PCIe port can be programmably configured (during network boot-up) to consist of an aggregation of 8 basic lanes for example with a lowest common bandwidth per lane of 2.5 Gb/s (Giga-bits per second) for example, thus giving the x8 Port an aggregated bandwidth of 20 Gb/s. A second PCIe port can be programmably configured during the same network boot-up to consist of an aggregation of just 4 basic lanes, thus giving that x4 Port an aggregated bandwidth of 10 Gb/s. A third PCIe port can be programmably configured during the same network boot-up to consist of just one lane; thus giving that x1 Port a bandwidth of just 2.5 Gb/s.

In a PCIe system, it is possible for a multi-ported switching device to have one of its ports logically configured as an aggregation of 2 basic lanes (thus giving the x2 Port a 5.0 Gb/s bandwidth) and another of its ports configured as one lane (a 2.5 Gb/s bandwidth for that communications port) due to adaptive link negotiations that take place during network bring up. However, despite the possibly different bandwidths that might be dynamically assigned to each of its ports, the conventional switching device will typically have a central or main set of ingress-receiving FIFO's with each FIFO having a same, constant data width and same, constant FIFO depth. This conventional paradigm can create inefficiencies as will be explained in greater detail below.

SUMMARY

Structures and methods may be provided in accordance with the present disclosure of invention for improving over the above-described, conventional design approach.

A packets transfer device in accordance with the present disclosure is configured to have data-absorbing buffers (e.g., ingress FIFO's) with programmably variable (elastic) buffer depths for each of programmably re-configurable ports or communication channels so that the depth of the data-absorbing buffers may be efficiently tailored to match the bandwidth needs of differently configured ingress and/or egress channels or ports.

A machine-implemented method is provided in accordance with the disclosure for configuring a plurality of data-absorbing buffers where the buffers are to be used for receiving data from respective ingress channels and where at least a first and second of the ingress channels can be programmably or dynamically re-configured to have substantially different data bandwidths per channel (e.g., different link widths; different numbers of lanes per port). The method includes the machine-implemented steps of: (a) determining the data flow rates (e.g., maximum data flow rates or bandwidths) of at least first and second ingress channels after the channels are programmably or dynamically configured; (b) in response to the determining step (a), defining corresponding first and second virtual buffers (e.g., virtual FIFO's) within a common memory unit where depths of the defined virtual buffers are respective functions of the determined data flow rates of the first and second ingress channels. In one embodiment, the first and second channels are respectively defined to include first and second PCI-Express ports where assignment of one or more lanes to each PCIe port occurs during network bring-up negotiations (during run-time operations of the network). Each post-bring-up port has at least one virtual buffer (e.g., virtual FIFO) defined for it with depth of the virtual buffer is a function of port speed.

More specifically, in accordance with one aspect of the present disclosure, an integrated circuit is provided that comprises: (a) a detector for detecting post-negotiation channel widths (e.g., link widths) a communications system having plural channels with variable channel widths; (b) a FIFO creator, operatively coupled to the detector, the FIFO creator establishing virtual FIFO's for servicing data of the plural channels, where each virtual FIFO has a respective FIFO depth, and where the FIFO creator establishes the FIFO depths of the virtual FIFO's as a function at least of the post-negotiation channel widths. In one embodiment, the integrated circuit is embedded within a PCI-Express communications system.

Other aspects of the disclosure will become apparent from the below detailed description.

BRIEF DESCRIPTION OF THE DRAWINGS

The below detailed description section makes reference to the accompanying drawings, in which:

FIG. 1 is a block diagram of a hypothetical packet switching system having same-depth, ingress FIFO's but data sources of differing bandwidths;

FIG. 2 is a block diagram of a packet receiving system having programmably configurable ports feeding on a multiplexed basis into a common ingress buffer memory;

FIG. 3B is a schematic diagram providing a more detailed look at one embodiment in accordance with FIG. 3A.

DETAILED DESCRIPTION

Figure 3A:
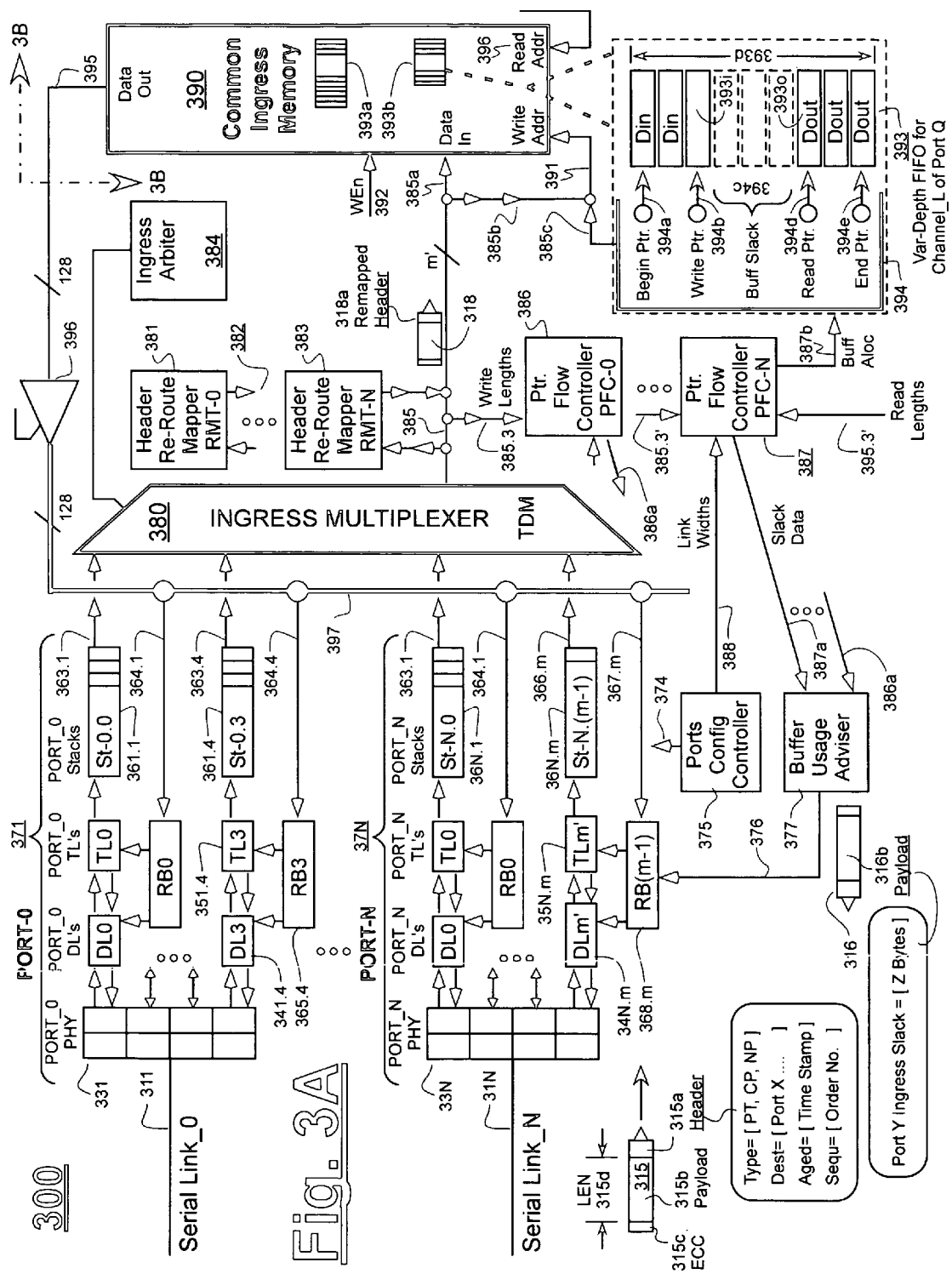
FIG. 3A is a schematic diagram of PCI-express compatible, data transfer device wherein virtual FIFO's are automatically configured to have respective depths corresponding to data speeds assigned to respective ports during network configuration.

Referring to a hypothetical first telecommunication system 100 that is schematically illustrated in FIG. 1, seen under column 105 are first through fourth data source devices, 101-104. Data source device "A" (101) is taken to have a relatively large data output bandwidth while device "B" (102) has a relatively small bandwidth and device "C" (103) has a median bandwidth. Device "D" (104) of the example is shown to have a relatively large bandwidth, like that of device "A", although it could have instead been programmably or fixedly configured to have an output bandwidth value almost anywhere in the allowable spectrum of the system between what may be considered a very small bandwidth (system minimum) and very large bandwidth (system maximum). Specific bandwidth values may vary from application to application. FIG. 1 is provided mostly for purpose of generically illustrating certain problems associated with telecommunication systems that employ data sources or data pipes of different bandwidths but data-absorbing buffers of constant and same depths.

Represented under column 110 are aggregations of the physical transmission media and logical transmission pipes 111-114 which respectively conduct signals from the respective data source devices 101-104 to an ingressing-data side (receiving side) of a data buffering memory area 130. In practice the physical transmission media and/or logical data transfer pipes 111-114 will generally not have differing appearances and each may appear simply as a single coaxial cable or a high frequency transmission strip on a printed circuit board coupled to a physical media interface circuit followed by SERDES circuitry. In one embodiment, all the illustrated pipes 111-114 can be multiplexed over a single optical transmission line prior to being demultiplexed and de-serialized into parallel electrical signal flows. In order to graphically illustrate certain aspects, however, the transmission media/pipes 111-114 are schematically shown as being separate wide, narrow or medium width data pipes. Transmission pipe 111 is shown to be a relatively "fat" data flow pipe which can handle the large output bandwidth of device "A". (101). In contrast, transmission pipe 112 is shown as a comparatively thinner data flow pipe which handles no more than the smaller output bandwidth of device "B" (102). Similarly, transmission pipe 113 is shown as an average width data flow pipe that is configured to handle the median output bandwidth of device "C" (103). The fourth pipe 114 is shown as a fat data flow pipe to match the large bandwidth of its data source device "D" (104).

Shown at 115 is an exemplary data packet having a header section 115a, a payload section 115b and an error checking and correcting section (ECC) 115c. It is to be understood that each of pipes 111-114 carries digital data packets similar to 115 except that the specific structures, lengths and/or other attributes of packets in each pipe may vary from application to application. (For example, some packets may not include ECC sections like 115c.) The data packets (e.g. 115) that are received from the respective ingress pipes 111-114 appear at a data-input side of memory region 130 as respective write data flows 121-124. Routing means (not shown) may be provided within the ingress data buffering memory 130 for directing respective data flows 121-124 to corresponding FIFO buffers 131-134. In accordance with conventional FIFO configuration schemes, each of FIFOs 131-134 has a same data width (bits per storage location) and a same depth (total storage capacity). In the illustrated example, it is assumed that the depth (or other form of storage capacity) of FIFO 133 has been picked by luck to be "just right" (neither too much nor too little) for matching the data input rate seen on an average ingressing data flow pipe such as 113 and also matching the data outflow rate seen on an average egressing data flow pipe such as 163.

Given that the FIFO depth of FIFO 133 is "just right" for an average input rate and given that all FIFO's in this example are of same depth and width, the top most FIFO 131 will inherently be "too shallow" in depth for its respective fat ingress pipe 111 and the second FIFO 132 will inherently be "too deep" for its respective thin ingress pipe 112. Since FIFO 134 mimics the situation of FIFO 131 in this example, FIFO 134 also will inherently be "too shallow" in depth for its respective fat ingress pipe 114.

When a given FIFO such as 113 is deemed to be "too shallow" for the data flow rate of its respective fat ingress pipe 111, that means that the FIFO 131 will fill up with ingressing data at a fairly rapid rate and the FIFO 131 will threaten to enter an undesirable overflow condition. In order to prevent overflows from occurring, in one variation, back pressure signals (e.g. in packet 116) can be sent back to the data sourcing device (e.g., 101) telling it to stop sending more data through the fat pipe until the data that is already stored within the too-shallow FIFO (e.g., 131) can be appropriately discharged (read out) by way of a data readout path such as 141. In another variation, and again for purposes of trying to prevent overflows from occurring, slack-reporting or advising signals (e.g. in packet 116) can be sent back to the data sourcing device (e.g., 101) telling it how much slack space there currently is in corresponding FIFO (131). The data sourcing device (e.g., 101) is given the responsibility in this later variation of theme to not send more new data into pipe 111 than can be safely absorbed by the reported slack space in the corresponding FIFO (131).

A number of inefficiencies are created by the mismatched coupling of a too-shallow FIFO such as 131 to a relatively fat ingress pipe such as 111. First, the wide bandwidth of the fat pipe 111 is wasted every time that a feedback control signal 116 causes the data source device 101 to withhold new data that device 101 wants to send to FIFO 131. Second, control bandwidth may be wasted by constantly sending back warning packets like 116 telling device 101 that slack space in FIFO 131 is small and that the too-shallow FIFO 131 is again threatening to overfill. Another drawback is that of increased danger that the too-shallow FIFO 131 actually will overfill and thus create an error condition, one such error condition being that already-transmitted telecommunication data is lost after having been successfully stored in memory unit 130.

Referring to the second FIFO, 132 which is shown in the example to be relatively too-deep, the problem here is the exact opposite. Write data 122 coming in from the too-thin ingress pipe 112 is so slow that it almost never fills up its counterpart, too-deep FIFO 132. The problem with this mismatch situation is that a big chunk of the storage capacity within the too-deep FIFO 132 is generally wasted because it almost never fills up with valid data. A good solution would be to cut a portion 132a of the excess memory capacity out of the second FIFO 132 and to donate that excess capacity to the too-shallow first FIFO 131. Then both problems could be solved, namely the ones relating to the bandwidth mismatch between units 111-131 and the ones relating to the bandwidth mismatch between units 112-132. If the excess memory capacity 132a could be so moved, then the first FIFO 131 will no longer be as relatively shallow as it is and the second FIFO 132 will no longer be as relatively over-deep as it is. (The second FIFO 132 minus excess section 132a may still have some slack capacity in it to compensate for extreme data flow conditions but it will not be as overly deep as it is in the example of FIG. 1.) It is understood in accordance with the disclosure that some of the excess storage capacity 132a cut out of the second FIFO 132 would also be donated to the too-shallow fourth FIFO 134 so that the fourth FIFO 134 is also not as overly-shallow as is indicated in FIG. 1.

Respective output signals 141-144 of memory unit 130 are read out of respective FIFO's 131-134 and sent into switcher device 150. The switcher device 150 reroutes data packets for egress through egress paths 151-154 in accordance with header information contained in each of the various packets. Under certain circumstances, the switcher 150 can be overwhelmed with too many, conflicting switching requests. To deal with this problem, one of the functions usually implemented within the switcher 150 is that of providing a control feedback channel 156 that sends feedback control packets 116 to the various data source devices 101-104 indicating to them that they may need to take corrective action to avoid possible data overflow or underflow conditions. In one variation, the switcher 150 keeps track of the amount of spare or slack space in each of FIFOs 131-134 by keeping track of empty memory between the write pointer for ingressing data 121 and the read pointer for egressing data 141 (of FIFO 131 for example). This slack space information may be packaged into the return packets 116 that are sent back to the data sources as slack advisements. Although FIG. 1 shows feedback path 156 returning only to data source device 101, it is to be understood that this done for sake of illustrative brevity. In practice, each of the data sourcing devices 101-104 will normally have advisement feedback data sent to it. The data sources 101-104 may use the FIFO-slack information that is included in the feedback data to determine which destinations their respective outputs may be safely directed to and which destinations should be left unbothered for the time being. Although FIG. 1 shows data source device "A" (101) as directing all of its output into the fat ingress pipe 111, in one embodiment data source device A has the option of spending some of its bandwidth directing output to other pipes and/or other devices besides switcher 150 and its preceding ingress data buffering memory 130. Similarly, each of data source devices 102-104 might be able to intelligently redirect parts of their respective output bandwidths to other destinations when switcher 150 and/or its ingress side buffer 130 are already too overwhelmed with current work loads (e.g., retrying egress transmission of noise-infected signals) and in-transit data is thus less likely to be lost.

The output of switcher 150 is shown to include data output flows 151-154 going to respective egress pipes 161-164. The illustrations of comparatively thin and fat widths for these pipes 161-164 is for purpose of example. Pipe 161 is thin and therefore it tends to cause respective FIFO 131 to back up or overfill, given that FIFO 131 is "too shallow". Egress pipe 162 is shown to be relatively fat so that it quickly empties FIFO 132 and therefore causes the assigned depth of FIFO 132 to be deemed "too deep". Egress pipe 163 is shown to be of average bandwidth so that the corresponding buffer depth of FIFO 133 is deemed to be "just right". Respective data output flows 171-174 of the various egress pipes 161-164 may continue to data receiving devices, where the latter data receiving devices may include some or all of data source devices 101-104. The receiving devices may send back pressure feedback signals and/or other quality of service (QOS) signals back to the switcher 150. However for purposes of simplicity, such additional control pathways are not shown. While FIG. 1 shows a particular mix of ingress and egress bandwidths for each of FIFO's 131-134, in practice each of FIFO's 131-134 may see a programmably varying environment where, for example, FIFO 131 switches from being "too shallow" to being "too deep" because the bandwidths of its ingress and egress pipes are programmably flipped during a system reconfiguration operation. This aspect will become clearer with next-described FIG. 2. Incidentally, the processing of data stored in the data-absorbing buffers 131-134 need not be limited to just switching or routing via use of switcher 150. This is merely an example. The data-absorbing buffers 131-134 could have been positioned as post-processing buffers or mid-processing buffers. More typically they occupy a pre-processing position in the data processing subsystem that includes items 110, 130 and 160.

FIG. 2 provides a more detailed explanation of how the bandwidth mismatch problem may develop seen within the environment of a PCI-express™ system 200. In the PCI-express environment, a multiplexed serial physical link such as 211 couples a high frequency output amplifier 201 to a corresponding input amplifier 221. (The illustrated multiplexed serial physical link 211 is merely conceptual and may be implemented by use of plural twisted wire couplings rather than just one.) Multiple channels of data may be transmitted over the first multiplexed serial physical link 211 by use of one or more forms of signal; multiplexing. Time domain multiplexing (TDM) may be used for example, on the physical serial link 211 for mixing together a number of sub-channels or "lanes" of data as they are called in PCI-express so as to define an aggregated channel of data flowing into a corresponding logical "port" or PCI-Express "link" 271. In the example of multiplexed serial physical link 211 and its corresponding, first ingress port 271, system configuration operations have created an aggregation of four lanes numbered 1-4, with each lane being one byte (B) wide. A physical layer interface portion 231 (PHY) of PORT_1 (which port is also identified as port 271) receives the serially transmitted signals of multiplexed link 211 (e.g., a differential signal sent over a complementary twisted wire pair) and converts the received, serial data into four parallel data flows that respectively flow into respective Data Link layer sections DL1, DL2, DI3 and DL4 of column 241. After appropriate error checking and/or error correction (e.g., ECC) operations take place in DL column 241, the respectively ingressing signals of the 4 lanes continue into transaction layer (TL) column 251 of Port_1 for transaction level processing. TL processed data words (e.g., bytes) are then temporarily stored in respective data sequence storage units or data stacks (FIFO's) St-1.1 through St-1.4 of Port_1 as seen in column 261. The outputs of stacks St-1.1 through St-1.4 feed into an ingress multiplexer 280. (Stacks St-1.1-1.4 incidentally, are not push-pull type CPU stacks, but rather a means for temporarily stacking up the received ingress data of their respective lanes. They are small pre-buffers relative to the larger data-absorbing buffers (e.g., FIFO's) 293 maintained in memory unit 290 for absorbing the aggregated data flows of each plural ports 271-27N.)

At the same time that serialized data is flowing into Port_1 (271) at a respective first, aggregated data rate (which rate is established by aggregating four lanes together to define Port_1 271), other serialized data may be flowing into Port_2 (272) at a respective second, aggregated data rate, different from the first data rate. In the illustrated example, the second port, 272 has been configured to receive two lanes worth of PCI-express traffic as compared to the four lanes worth that first port 271 has been configured to receive. The Port_2 data moves through physical (PHY) layer 232, then through DL layer 242 as respective two lanes of data, then through TL layer 252 before reaching respective stacks St-2.1 through St-2.2 of Port_2 as seen in column 262. The outputs of stacks St-2.1 through St-2.2 feed into the ingress multiplexer 280.

It should now be apparent that the ingress multiplexer 280 has channels with potentially different rates of data input flows ingressing towards it from the first and second PCI-express ports, 271 and 272 (the actual rates being dependent on current traffic conditions on physical links 211 and 212). For purpose of completeness, FIG. 2 shows that there can be a number N of differently configured ports, where the last port in the series, 27N is configured to receive an aggregation of m lanes of data from physical link 21N. Physical layer 23N deserializes the data into data link sections DL1 through DLm of column 24N. The data continues through transaction layer 25N and into stacks respective stacks St-N.1 through St-N.m of the m-lane Port_N as seen in column 26N. The outputs of stacks St-N.1 through St-N.m feed into the ingress multiplexer 280.

In the illustrated example, the ingress multiplexer 280 has an m'-Bytes wide parallel output bus 285 feeding into the Data_In port of a Common Ingress Buffering (CIB) Memory unit 290. In one embodiment, m' is equal to m, where the latter value is the largest number of lanes configured for among the N ports of the system 200. This allows a by-m port (a xm Link) to write all m of its output bytes into the memory 290 in one clock cycle. In other embodiments, m' may be of a different value, this depending on the clock speed maintained on multiplexer output bus 285. In one embodiment, for example, m' is equal to 4, thus causing parallel output bus 285 to be 32 bits wide.

The big picture import of FIG. 2 is that the ingressing data streams from temporary stacks St-1.1 through St-N.m are further buffered in CIB memory unit 290 before being output via output bus 295 for further processing. The CIB memory unit 290 provides the primary buffering or data-absorbing buffer function for the ingressing data streams while the stacks St-1.1 through St-N.m provide buffering to a much smaller, lane-by-lane, and more temporary degree. The present disclosure is primarily directed to the problem of how to allocate storage space within the Common Ingress Buffer memory unit (CIB) 290 given the problems identified in FIG. 1. More specifically, block 293 is shown to contain a plurality of FIFO's. If each of ports 271, 272-27N is programmably configured to have m lanes (and if each lane carries just one virtual channel, v=1 worth of data), then block 293 will contain at least N same-sized FIFO's; one FIFO for each channel. If some ports are programmably configured to have less than m lanes during system configuration (but still v=1 virtual channels per lane) while others have m lanes, then block 293 will still contain at least N FIFO's, but according to the invention, some of the FIFO's will be deeper than others. If one or more of the ingress lanes is further configured to have a plural number of virtual channels, then the number of FIFO's implemented in block 293 will be equal to the total number of virtual channels present on the left side of multiplexer 280; the maximum value of that number being N*m*v' where v' is the maximum number of virtual channels allowed per thinnest lane. (Actual values of N, m and v' can vary from application to application.)

Under conventional practice in the PCI-express field, practitioners did not account for the rate differences of faster ports (e.g., 271) versus slower ports (e.g., 272) as configured on the left side of multiplexer 280. They merely counted the number of virtual channels and provided a corresponding number of FIFO's, each of identical size in block 293. By contrast, and in accordance with the present disclosure, the corresponding number of FIFO's in block 293 are not necessarily of the same size, but rather, FIFO size is made dependent at least on the specific data flow bandwidths of the variably-adjustable ports and/or virtual channels provided on the left side of multiplexer 280.

In FIG. 2, an ingress buffer control unit 291 is shown operatively coupled to the CIB memory unit 290 by way of bus 292 for coordinating the storage of ingressing data within CIB memory unit 290. An ingress multiplexer control unit 281 is shown operatively coupled to the ingress multiplexer 280 by way of bus 292 for coordinating the selection activities of the ingress multiplexer 280. The ingress buffer control unit 291 operatively couples to the ingress multiplexer control unit 281 by way of bus 298.

Referring to FIG. 3A, some additional background on PCI-Express may be in order at this point, particularly as it applies to negotiated port aggregation or bifurcation. The more standard, PCI bus is a well known form of standardized signal interchange within the field of digital computer and communication system design. One lesser known extension of the PCI bus standard is referred to as PCI-X. An emerging, but not as yet, well known extension of these is referred to as PCI-Express. The three should not be confused with one another. The present disclosure is mostly directed to the industry-defined, PCI-Express protocol but can also be applied to other serial link protocols that support programmable port configuration such as HyperTransport™ (see http://www.hypertransport.org) for example.

PCI-Express has some unique attributes among which is use of a type of data exchange known as a non-posted split transactions and posted transactions. The split transaction involves two types of packets: a completion packet (CP) and a companion non-posted packet (NP). The posted transaction uses a third type of packet identified, appropriately, as the posted transaction packet (PT).

PCI-Express is further characterized by its use of high speed serial links and of packets structured to move through such high speed serial links. Like other communication standards, the PCI-Express protocol has a layered architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling, while further using 8B/10B or like link encoding and using AC-coupled differential signaling. A complementary set of LVDS pairs is called a link. The PCI-Express standard allows for re-configurable lane combinations within each logical channel so as to thereby form different numbers of wider (faster) or narrower (slower) communication channels designated as x1, x2, x4 and so on up to x32; where the x1 configuration of a given port is the slowest (narrowest) and the x32 configuration is the fastest (widest). Multi-lane links can provide for higher bandwidth communication capabilities than can a comparable single-width link that has long dead times. The Data link layer of the PCI-Express protocol is typically characterized by packet exchange standards that govern how packets route between neighboring PCI-Express entities and over its single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices.

There is much to the PCI-Express standard that is beyond the scope of the present disclosure. More information about the standard may be obtained via the internet from the PCI Special Interest Group at: http://www.pcisig.com/specifications.

The PCI-Express standard was initially designed for a single host environment, meaning that it was originally structured to have only one, intelligent host (i.e. a microcomputer or CPU) interfacing with a plurality of less intelligent endpoint devices such as memory units and wired or wireless communication ports. The host was expected to function as the "root" of the PCI-Express network hierarchy tree and to initialize the network, while the rest of the tree was formed of branches made of serial links, bridges and switches that provide signal routing (packet routing) between the host and an array of subservient, endpoint devices hanging off the branches as leaf nodes. Over time, methods have been developed to support multi-root networks. Details on this are beyond the scope of the present disclosure, but suffice it to say that multi-root networks can boot-up in different configurations depending on the states of devices in each of the root complexes. A network can be brought up at different times with some of its root complexes being inoperative and others being operative. Designers may not know until network bring-up and self-discovery commences what port configurations should be employed in order to make efficient use of available resources.

One function that occurs during network bring up and resource discovery is known as port aggregation or bifurcation. Devices negotiate with each other as to how each should set its ports to be configured in the allowed spectrum of x1 to x32 lanes per port and 1 through N ports per operative device on the network. In other words, it is often not known until network bring up time how ports will aggregate, degenerate or bifurcate into one number of lanes per port or another such number, depending on how dynamic negotiations proceed. This raises the problem addressed in FIG. 1.

Referring to FIG. 3A, shown is a PCI-Express compatible device 300 (e.g., a monolithic integrated circuit chip) having N+1 PCI-express compatible ports denoted as Port_0 through Port_N. Each port can degenerate into just one lane or aggregated into m lanes during bring-up negotiations, where m can be a different number (up to a pre-defined maximum, e.g., 32) for each port. In the illustrated example, Port_0 (371) has aggregated into an x4 configuration (it contains 4 lanes) while Port_N (37N) has aggregated into a by-m configuration. PHY portions 331-33N of each port are shown as in FIG. 2 as well as DL, TL and Stack portions. Each stack portion (e.g. 361.1-36N.m) corresponds to a given lane within its respective port. Additionally, the signal egress aspects of each port are shown in FIG. 3A whereas they were not in simpler FIG. 2. The signal egress aspects are represented by the bi-directional couplings such as between DL and TL blocks and also by inclusion of Retry Buffers such as RB0 through RB(m−1) {latter also denoted as 368.m}. The retry buffers (e.g., 368.m) temporarily store egress data. This temporarily stored egress data is retransmitted out to the link (e.g., 31N) in cases where line noise or other problems occur on the corresponding link (311-31N) or elsewhere in the network. If noise corrupts a first-time transmitted version of the egress data, the data may have to be re-transmitted a second time in response to a retransmit request. System designers can avoid having to reprocess the corrupted data by temporarily storing processing results (e.g., post-switching packets) in the retry buffers (RB's).

In the illustrated embodiment 300, egress data moves from a 128 bit (16 Byte) tri-state bus 397 into respective retry-buffers (RB0-RB(m−1)). It is assumed in this example that the largest aggregation value per port will be x16 rather than the PC-Express allowed maximum of x32. If the by-32 aggregation value is allowed as a maximum, then in one corresponding embodiment, the tri-state egress bus 397 would be 32 Bytes wide rather than the illustrated 16 Bytes of width so as to thereby provide each port with an ability to simultaneously receive 32 bytes of data per clock tick, with one byte going to each of the 32 lanes in a maximally aggregated port. Unit 375 (Ports Configuration Controller) stores the port aggregation information after network bring-up negotiations complete. Lane aggregation control signals propagate on bus 374 to the respective N+1 ports while the so-called link-width or aggregation number (x1, x2, ... x16, ... x32) is output on bus 388 to PFC units 386-387. In one embodiment, each PFC unit (e.g., 387) receives only the link-width (aggregation number) of its corresponding port via line 388 and responds accordingly as is detailed below. In an alternate embodiment, each PFC unit (e.g., 387) also receives an indication of how many virtual channels are being programmably implemented on its corresponding port (e.g., Port_N) via line 388. In yet another alternate embodiment, each PFC unit (e.g., 387) also receives an indication of how many virtual channels and/or lanes are being programmably implemented on one or more of the other ports and the PFC unit responds accordingly as is detailed below.

There are N+1 Pointer Flow Control (PFC) units 386-387 in system 300, one for each of ports 0 through N respectively. Each PFC (386-387) receives from bus 388, at least the link width value of its respective port. Using at least this link width data (388), each respective Pointer Flow Control unit (e.g., 387) establishes the depth of one or more virtual FIFO's (e.g., 393a, 393b) within memory unit 390. In other words, FIFO depth is made to be a variable function of link width data transmitted over line 388. The FIFO depth (e.g., 393d) of a given virtual FIFO (e.g., 393 which FIFO is shown in magnified form at the bottom right of FIG. 3A) can be defined as the storage space provided between the start location identified by a begin pointer 394a of the given virtual FIFO and the end location identified by an end pointer 394e of the FIFO. Pointers 394a and 394e are stored in a pointer memory unit 394 (also shown as 394' in FIG. 3B). Those skilled in the art will appreciate that the virtual FIFO's or other such data-absorbing buffer can be programmably defined using a number of variations including use of base and offset addresses. For example, the end address (394e) of a FIFO can be identified by an offset from the begin address (394a) where that offset corresponds to the depth (393d) of the given FIFO (393).

The problem introduced in FIG. 1 is solved by causing the depths of the data-absorbing buffers (e.g., virtual FIFO's 393a, 393b) to be functions of at least the link widths (388) of their corresponding communication channels so that those virtual FIFO's that are fed by wide links and/or wide virtual channels are deeper than those virtual FIFO's that are fed by narrower links and/or narrower virtual channels. In one embodiment, at least three virtual FIFO's (e.g., 393a, 393b) are defined for each PCI-express port or virtual channel (VC): one for ingressing PT packets of that port/channel, a second for ingressing CP packets and a third for ingressing NP packets of that port or virtual channel. The separate virtual FIFO's for different packet types is better shown in block 393.S of FIG. 3B; which is discussed below. (Note also the type field in header 315a of PCI packet 315, where the type field may be used to indicate if the packet is a PT, CP or NP type.)

Referring to the pointer memory unit 394, provided between the begin pointer 394a and the wraparound end pointer 394e of each virtual FIFO (e.g., 393, 393a,b) there are two advanceable pointers: a write pointer 394b and a read pointer 394d. Each time a new ingress byte is written into a next empty byte slot 3931 in the corresponding virtual FIFO, the write pointer 394b advances by one. (Other increments with interlace are of course possible.) Each time an aged egress byte is read out from the oldest filled slot 3930 (or head) of the corresponding virtual FIFO (e.g., 393b), the respective read pointer 394d advances by one. (Other increments with interlace are of course possible.) Slack space 394c between the filled oldest slot 3930 and to-be-filled newest data slot 3931 can be computed from knowledge of the current values of the write pointer 394b and the read pointer 394d as well as the FIFO begin and end pointers (394e-394a).

Pointer Flow Control unit 387 of Port_N is shown as receiving two signals: the latest write lengths for Port_N FIFO's on bus 385.3' and the latest read lengths for Port_N FIFO's on bus 395.3'. Pointer Flow Control unit 386 is understood to receive corresponding write and read length indicating signals for virtual FIFO's of its respective Port_0. By keeping track of current write and read lengths for each virtual FIFO of its respective port and/or port-internal lanes; and by knowing the FIFO begin and end addresses (394a, 394e) that have been programmably defined for its virtual FIFO's of its respective port (see FIG. 3B), each Pointer Flow Control unit (386-387) can compute the current amount of slack space 394c available in the respective virtual FIFO's (e.g., 393) of its port. The current slack space amount (e.g., 394c) is reported or "advertised" back out into the network using feedback packets such as 316. For the case of PFC_N (387), line 387a transfers the currently computed, slack data (394c) to a buffer usage adviser unit 377 associated with the respective link of the respective, virtual FIFO (393). The buffer usage adviser unit 377 couples to the link's Retry Buffers (e.g., 368.m) by way of line 376. It generates appropriate feedback packets like 316 that contain in their payload section 316b or elsewhere, indications of the amount of slack space available in corresponding ones of the virtual FIFO's (e.g., PortY ingress slack=[Z Bytes]). The buffer usage adviser unit 377 then causes the generated feedback packets (e.g., 316) to be sent out from the corresponding port at appropriate times when the physical link (e.g., 31N) has bandwidth available for such function. In one embodiment, the slack space data is packed into the headers of egressing packets (316) rather than into their payloads sections (316b). The payloads sections are used transporting output data of a switcher (150 of FIG. 1) and/or of another data processing unit that outputs to the respective port (e.g., 37N).

As ingressing PCI-express data accumulates in the lane stacks St-0.0 through St-N(m-1), and ingress arbiter 384 determines which link will be next serviced by the ingress multiplexer 380, the length of packet data written into memory 390 may vary depending on packet type and the amount of payload data carried by each of the ingressing packets. Typically, one or more bytes output by the ingress multiplexer 380 will contain data indicating the packet length of its respective packet 318. This data is sent to the PFC's (386-387) as respective write length information (385.3). Reported write length information is used for reducing the current slack count for the affected virtual FIFO (e.g., 393a). Update of the slack count may happen while the corresponding packet 318 continues to move from multiplexer 380 and on bus 385 for input into, and writing into the common ingress memory unit 390. The specific virtual FIFO (e.g., 393a, 393b) which the packet 318 will be written to may be selected by destination address data placed in the packet's header 318a. In one embodiment, a plurality of header re-route mapping tables 381-383 are provided for intercepting packets output by multiplexer 380, reading their original header data via connection 382 and storing remapped header data into them also via connection 382. The remapped header data feeds forward by way of path 385b to form part of the write address signal 391 that drives the common memory unit 390. Actual packet data is delayed to account for the write latency of memory unit 390. Path 385c carries the incremented write pointer value (394b) that adds to the base value of the begin pointer 394a for identifying the next empty slot location 3931 in the corresponding virtual FIFO 393. In one embodiment, the header re-route mapping tables 381-383 define index values into the FIFO allocation memory 394. Each mapping index value is substitution wise replaced by the absolute value of the current write pointer 394b of the corresponding virtual FIFO for use in generating the write address 391 applied to memory unit 390. In an alternate embodiment, the write and read pointers (394b, 394d) may operate as relative offsets to base begin and/or end of buffer values stored in the FIFO allocation memory 394.

The begin and end pointers (e.g., 394a, 394e) of each virtual FIFO (e.g., 393, 393a, 393b) are normally defined during network bring up, and more specifically after port aggregation is negotiated for each physical link (e.g., 311, 31N). As already explained, the Ports Configuration Controller 375 stores the port aggregation information after network bring-up negotiations complete, and the PCC 375 forwards the resulting link width(s) information via connection 388 to corresponding PFC's 386-387. In response, the PFC's 386-387 (Pointer Flow Control units) define the corresponding begin and end pointers of their respective virtual FIFO's by way of buffer allocation connections like 387b.

Any one of a number of different methods may be used for elastically defining the depths of the virtual FIFO's (e.g., 393a, 393b) in response to the received link width(s) information 388. Referring to FIG. 3B, in one embodiment 300' each aggregate-able port (e.g., ports Q, R and S) is pre-assigned a memory area like 393.Q, 393.R and 393.S in which to establish the port's virtual FIFO's for the port's respective virtual channels. Memory areas 393.Q, 393.R and 393.S may each of the same size in one variation but are segmented differently based on the negotiated number of channels and channel widths of their respective ports. Memory area 393.S is drawn larger in FIG. 3B so that it can contain the additional textual material provided therein. It is assumed in FIG. 3B that port Q has bifurcated into two, relatively wide (relatively high bandwidth) channels in the illustrated example. Memory area 393.Q has accordingly been bifurcated into two relatively long (deep) virtual FIFO's; 393Q.1 and 393Q.2. It is further assumed for sake of example that port R bifurcated into four narrower virtual channels (Ch3-Ch6). Corresponding memory area 393.R has accordingly been bifurcated into four shallower virtual FIFO's; 393R.1 through 393R.4. The specific memory area allocated to each port, after lane aggregation and respective channel bifurcation operations complete (or all aggregation and bifurcation operations of the network complete) may be determined for example by a pre-programmed look-up table (LUT 389). Users may program the LUT 389 to implement any desired, lookup based assignment of number of virtual FIFO's, FIFO depths and/or block segmentations (e.g., split of block 393.R into four same length FIFO's). The lookup function which determines FIFO depth may be responsive to any one or more variables such as: channel bandwidth (388'); predetermined traffic patterns on respective ones of the channels or logical links; special higher priorities given to one or more of the channels or ports and implemented by assigning comparatively greater FIFO depths to the respective FIFO's of that channel or port than to counterpart FIFO's of a lower priority channel or port; and special QOS (quality of service) attributes assigned to one or more of the channels or ports and implemented by assigning comparatively greater FIFO depths to the respective FIFO's of that channel or port than to counterpart FIFO's of a lower priority channel or port.

In one embodiment, the LUT 389 is a nonvolatile one which is preprogrammed at the time of device manufacture or at the time of system initialization (but before link negotiations take place). It is to be noted that although a LUT 389 is shown, it is within the contemplation of the disclosure to use any of various algorithmic means for defining number data-absorbing buffers and depths of those buffers (e.g., virtual FIFO's) including use of combinatorial logic or other hardware based data transformation means in which aggregated bandwidth of each port and/or bifurcation of each port into plural virtual channels is taken into account together with available memory capacity for implementing the various elastic depth buffers. As mentioned, the respective memory areas of memory unit 390' that are respectively allocated to the respective ports do not all have to be the same size. Different numbers of virtual FIFO's with different depths may be established in each port's memory area. For example, in the case of Port S, its memory area 393.S has been subdivided into virtual FIFO's of different depths to service the different types of PCI-express packets: NP, PT and CP, for each of its respective virtual channels (e.g., channels 7 and 8). RMT's 381-383 (FIG. 3A) may re-route packets by type into their respective virtual FIFO's. Specific FIFO depth values for each type of FIFO (e.g., NP, PT or CP) may be defined in the lookup table 389 or its functional equivalent. In one embodiment, PT and CP FIFO's are segmented in their respective blocks to have same FIFO depths in that block while NP FIFO's are segmented to have comparatively smaller FIFO depths. In one embodiment, each port's buffer-allocating lookup table (LUT 389) is contained in the corresponding PFC (e.g., 386-387 of FIG. 3A) of that port and the link width information and/or channel width information 388' functions as the input address signal of the LUT 389. The responsive output of the LUT 389 defines the begin and end addresses of the virtual FIFO's (e.g., 393R.2) as stored into pointers memory unit 394', with this also operating to programmably define the number of FIFO's and the depths of the corresponding FIFO's (e.g., 393Q.1-393S.2b).

Read control unit 398 has access to the pointers stored in memory unit 394' so that the read controller 398 can determine which data to output onto output bus 395'. In one embodiment, the read controller 398 responds to urgency indicators generated by various ones of the ports that have egress bandwidth available for outputting corresponding egress data. The read controller 398 further responds to data aging indicators provided by head-end parts of packets awaiting in the respective virtual FIFO's. The read controller 398 further responds to urgency indicators generated for various ones of the virtual channels in each port. Upon making its output arbitration decisions, the read controller 398 outputs the corresponding read lengths of packets read out from the respective virtual FIFO's and sends the read lengths data 395.3' to the corresponding PFC's (386-387). The PFC's use the read lengths data 395.3' for generating slack advisements.

In an alternate embodiment, rather than using one LUT 389 for each port; for determining the numbers and depths of the virtual FIFO's; the PFC 386-387 (FIG. 3A) may interconnect with one another and negotiate among themselves as to which ports should get what size of memory area (e.g., 393.S) allocated to them and what buffer depths should be allocated to each of the virtual FIFO's in each of the respective memory areas in view of the lane aggregation and port-bifurcation information supplied on line 388.

Irrespective of which model is used for on-the-fly determining of the buffer depths allocated to each of the virtual FIFO's, the point is that elastic FIFO depths are established where the FIFO depths change in response to changing bandwidths of their corresponding ingress channels. The invention need not be limited to use in communication systems that use serial links of variable bandwidth such as may occur in PCI-express, and may be applied in other applications where FIFO efficiency can be improved by responsively adjusting elastic FIFO depths to data ingress rates seen or expected to be seen on corresponding ingress channels.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that the configuring of a lookup table (LUT) such as 389 of FIG. 3B in accordance with the disclosure can include the use of a computer (not shown) to analyze ingress rates of various channels and to empirically determine what FIFO depths might be optimum for a given application environment. A method in accordance with the disclosure may therefore include use of such in-situ traffic analysis and reprogramming of a LUT such as 389 of FIG. 3B or another FIFO's creating means to better optimize the FIFO depths assigned to different virtual FIFO's in response to received channel width information 388'.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or and works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method of configuring a plurality of data-absorbing buffers for receiving data from respective ones of plural ingress channels in a reconfigurable computer bus comprising programmably reconfigurable ports or communication channels where at least a first and second of the ingress channels can have different data flow rates, the method comprising the machine-implemented steps of:
  (a) determining corresponding data flow rates of at least said first and second ingress channels in the reconfigurable computer bus;
  (b) in response to said determining (a) of the data flow rates, defining corresponding first and second virtual buffers in a common memory unit where depths of the defined virtual buffers are respective functions of the determined data flow rates of the first and second ingress channels, where the respective functions tailor the first virtual buffer to be deeper than the second virtual buffer when the data flow rate of the first ingress channel is higher than the data flow rate of the second ingress channel and where the depths of the defined virtual buffers may be respective functions of one or more other attributes in the group consisting of: predefined channel traffic patterns, predefined channel priorities and predefined channel quality of service guarantees (QOS).

2. A packets transfer device for a reconfigurable computer bus having a plurality of configurable communication channels where data transfer rates of said plurality of configurable communication channels are at least one time configurable, the packets transfer device comprising:
  (a) a plurality of configurable data-absorbing virtual buffers having respectively configurable buffer depths, wherein a depth of a virtual buffer comprises a storage capacity allocated to the virtual buffer; and
  (b) one or more virtual buffer configuring units that are responsive to channel rate signals indicative of current data transfer rates associated with said plurality of configurable communication channels in the reconfigurable computer bus and that configure a corresponding one or more of the plurality of configurable data-absorbing virtual buffers to have buffer depths that are functions of one or more of the channel rate signals such that configurable data-absorbing virtual buffers can be configured to have different virtual buffer depths relative to other configurable data-absorbing virtual buffers.

3. The packets transfer device of claim 2 wherein:
  (a.1) said plurality of configurable data-absorbing virtual buffers are defined in a common buffer memory unit having a data input bus coupled to receive data ingress data from said plurality of configurable communication channels.

4. The packets transfer device of claim 2 wherein:
  (b.1) said one or more buffer configuring units are further responsive to read and write length signals indicative of current amounts of data respectively read into and written out of the plurality of configurable data-absorbing virtual buffers, said one or more buffer configuring units responsively outputting slack advisement signals indicative of slack space available in the plurality of configurable data-absorbing virtual buffers.

5. The packets transfer device of claim 2 and further comprising:
  (c) a re-programmable pointers memory unit operatively coupled to said one or more buffer configuring units, the re-programmable pointers memory unit storing pointer data indicating respective begin addresses of said plurality of configurable data-absorbing virtual buffers and end addresses or depths of said plurality of configurable data-absorbing virtual buffers.

6. The packets transfer device of claim 2 where said packets transfer device is included in a monolithic integrated circuit.

7. A machine-implemented method for configuring a plurality of data ingress buffers where the ingress buffers are to be used for receiving data from respective ingress channels of a reconfigurable computer bus and where at least a first and second of the ingress channels can be programmably reconfigured to have different data flow rates per channel, said method comprising the machine-implemented steps of:
  (a) determining data flow rates of at least the first and second ingress channels in the reconfigurable computer bus after the channels' configurations are defined; and
  (b) in response to the determining step (a), defining corresponding first and second virtual FIFO's (First-in, First-out buffers) where depths of the defined virtual FIFO's are respective functions of the determined data flow rates of the first and second ingress channels, where the respective functions tailor the first virtual FIFO to be deeper than the second virtual FIFO when the data flow rate of the first ingress channel is higher than the data flow rate of the second ingress channel and where the depths of the defined virtual FIFO's may be respective functions of one or more other attributes in the group consisting of: predefined channel traffic patterns, predefined channel priorities and predefined channel quality of service guarantees (QOS).

8. The machine-implemented method of claim 7 wherein the first and second channels are defined by bifurcation of corresponding first and second PCI-Express ports of a data transfer device and where port bifurcation occurs during network bring-up negotiations.

9. The machine-implemented method of claim 7 wherein the first and second channels are respectively defined as channels belonging to respective first and second ports, the first and second ports are assigned same-sized memory blocks for containing FIFO's of the respective ports; and the blocks are segmented into plural FIFO's where the block segmentation is responsive to amount of bifurcation of the respective ports.

10. A multi-port switching device for a reconfigurable computer bus having programmably reconfigurable ports or communication channels and having plural, bifurcatable ports, with each port implementing one or more communication traffic channels after port bifurcation based on a configuration of the reconfigurable computer bus; where each channel of each bifurcated port has at least one virtual FIFO (First-in, First-out buffer) defined for it and where depth of the at least one virtual FIFO of each channel is a function of traffic speed associated with the channel after port bifurcation, where the function of traffic speed tailors the at least one virtual FIFO of a first channel to be deeper than the at least one virtual FIFO of a second channel when the traffic speed associated with the at least one virtual FIFO of the first channel is higher than the traffic speed associated with the at least one virtual FIFO of the second channel and where the depth of the at least one virtual FIFO of each channel may be a function of one or more other attributes in the group consisting of: predefined channel traffic patterns, predefined channel priorities and predefined channel quality of service guarantees (QOS).

11. A monolithic integrated circuit (IC) that can be embedded in a computer system having a reconfigurable computer bus comprising programmably reconfigurable ports or communication channels and comprising plural channels with variable channel bandwidths, the channel bandwidths being determined by run-time negotiations carried out in the system; the IC comprising:
(a) a detector for detecting post-negotiation channel widths of two or more of the channels of the reconfigurable computer bus;
(b) a FIFO creator, operatively coupled to the detector, the FIFO creator establishing corresponding virtual FIFO's for servicing data of the two or more channels, where each virtual FIFO has a respective FIFO depth, and where the FIFO creator establishes the FIFO depths of the virtual FIFO's as a function at least of the post-negotiation channel bandwidths.

12. The IC of claim 11 where the FIFO creator establishes the FIFO depths of the virtual FIFO's as a further function of one or more attributes in the group consisting of:
predefined channel traffic patterns, predefined channel priorities and predefined channel quality of service guarantees (QOS).

13. The IC of claim 11 where said IC is embedded within a PCI-Express communications system.

14. A method of configuring a programmable integrated circuit (IC) for a reconfigurable computer bus comprising programmably reconfigurable ports or communication channels so that the IC defines FIFO depths of plural virtual FIFO's implemented in the IC, the method comprising:
causing the IC to automatically define said FIFO depths at least as functions of the reconfigurable computer bus comprising variable channel widths of data carrying channels that operatively couple to the IC, where the functions of variable channel widths tailors a first virtual FIFO to be deeper than a second virtual FIFO when a first variable channel width of a first data carrying channel is wider than a second variable channel width of a second data carrying channel, where said FIFO depths may be functions of one or more other attributes in the group consisting of: predefined channel traffic patterns, predefined channel priorities and predefined channel quality of service guarantees (QOS) and where said variable channel widths are defined by run-time operations of a network that includes the data carrying channels.

* * * * *